(12) United States Patent  
Nakashima et al.

(10) Patent No.: US 7,055,855 B2
(45) Date of Patent: Jun. 6, 2006

(54) GAS GENERATOR FOR MULTI-STAGE AIR BAG

(75) Inventors: Yoshihiro Nakashima, Hyogo (JP); Nobuyuki Katsuda, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 44 days.

(21) Appl. No.: 10/297,172

(22) PCT Filed: Jun. 8, 2001

(86) PCT No.: PCT/JP01/04856

§ 371 (c)(1),
(2), (4) Date: Dec. 3, 2002

(87) PCT Pub. No.: WO01/96153

PCT Pub. Date: Dec. 20, 2001

(65) Prior Publication Data

US 2003/0137138 A1    Jul. 24, 2003

(30) Foreign Application Priority Data

Jun. 12, 2000    (JP)    .............................. 2000-174731

(51) Int. Cl.
*B60R 21/26* (2006.01)

(52) U.S. Cl. ...................... 280/736; 280/741; 102/531

(58) Field of Classification Search ................ 280/736, 280/740, 741, 742; 102/530, 531
See application file for complete search history.

(56) References Cited

U.S. PATENT DOCUMENTS

| 5,564,743 | A | | 10/1996 | Marchant | |
|---|---|---|---|---|---|
| 5,934,705 | A | * | 8/1999 | Siddiqui et al. | 280/736 |
| 6,189,924 | B1 | * | 2/2001 | Hock | 280/736 |
| 6,189,927 | B1 | * | 2/2001 | Mossi et al. | 280/736 |
| 6,199,906 | B1 | * | 3/2001 | Trevillyan et al. | 280/736 |
| 6,648,370 | B1 | * | 11/2003 | Koga et al. | 280/736 |

FOREIGN PATENT DOCUMENTS

| EP | 0773145 A2 | 5/1997 |
|---|---|---|
| EP | 0787630 A1 | 8/1997 |
| EP | 1155927 A | 11/2001 |
| EP | 1266807 A | 12/2002 |
| JP | 3029326 U | 9/1996 |
| JP | 9-183359 A | 7/1997 |
| JP | 3040049 U | 8/1997 |
| JP | 10-297416 A | 11/1998 |
| JP | 10-315901 A | 12/1998 |
| JP | 11-48905 A | 2/1999 |
| JP | 11-59318 A | 3/1999 |
| JP | 11-189124 A | 7/1999 |
| JP | 11-217055 A | 8/1999 |

* cited by examiner

*Primary Examiner*—David R. Dunn
(74) *Attorney, Agent, or Firm*—Birch, Stewart, Kolasch & Birch, LLP

(57) ABSTRACT

A multistage type gas generator for an air bag, which has a simple structure and can be easily manufactured and in which combustions of gas generating agents provided in a plurality of combustion chambers do not influence each other, is provided. In the multistage type gas generator, a plurality of the combustion chambers are provided in an axial direction of a cylindrical housing.

67 Claims, 3 Drawing Sheets

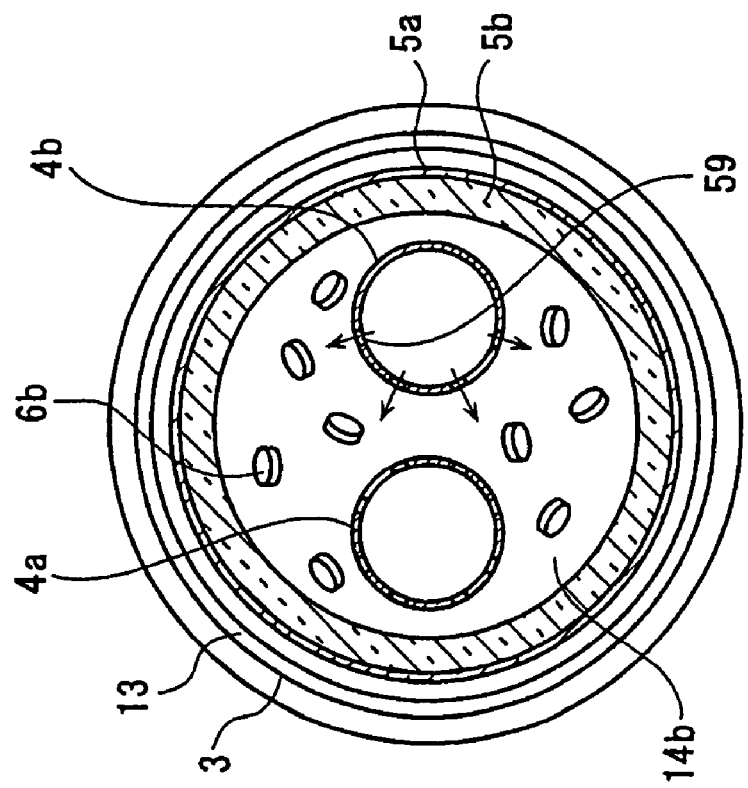
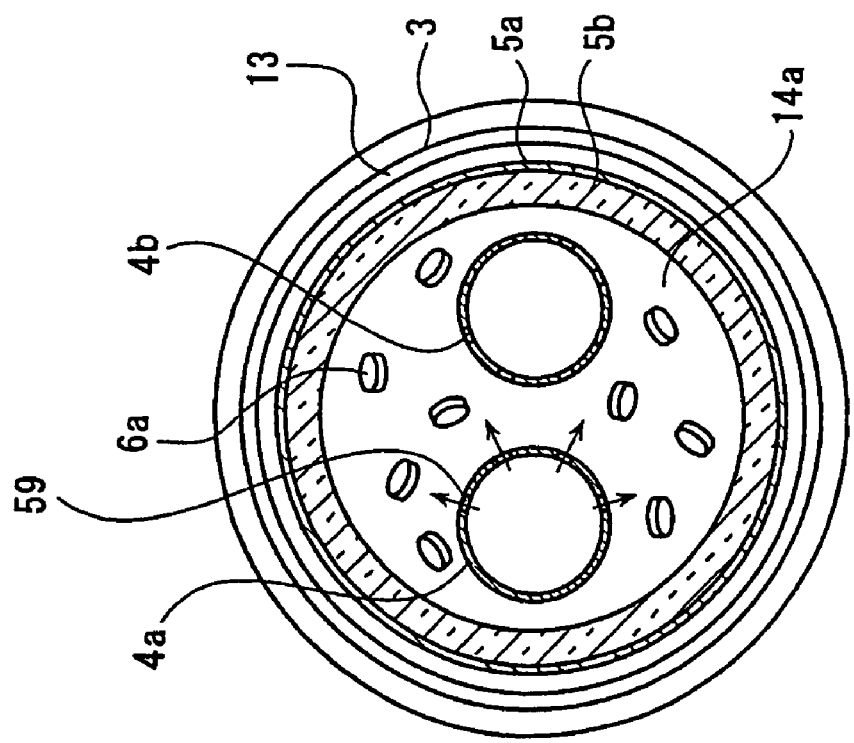

GAS GENERATOR FOR MULTI-STAGE AIR BAG

CROSS-REFERENCE TO RELATED APPLICATION

This application is the national phase under 35 U.S.C. § 371 of PCT International Application No. PCT/JP01/04856 which has an International filing date of Jun. 8, 2001, which designated the United States of America

BACKGROUND OF THE INVENTION

1. Field of the Invention

The present invention relates to a gas generator for an air bag which can be suitably used in an inflating-type safety system for motor vehicles, and more particularly, to a multistage type gas generator for an air bag provided with a plurality of combustion chambers and which is preferable for mass production and a stabilized operation performance.

2. Description of the Related Art

An air bag apparatus which is mounted on various kinds of vehicles including automobiles, aims to hold an occupant of the vehicle by means of an air bag (a bag body) that rapidly inflates by a gas when the vehicle collides at a high speed in order to prevent the occupant from crashing into a hard portion inside a vehicle compartment such as a steering wheel and a windscreen due to an inertia to prevent the occupant and from being injured. This kind of air bag apparatus generally comprises a sensor, a control unit, a pad module, and the like, and the pad module comprises a module case, an air bag, a gas generator, and the like, and it is mounted, for example, on a steering wheel.

The gas generator is constituted such that, when igniting means is actuated by an impact, gas generating means is burnt to generate a high temperature, high-pressure gas, and the generated gas is ejected into the air bag (a bag body) such that the air bag is inflated to form a cushion between the steering wheel and the occupant to absorb the impact.

Various kinds of gas generators have been developed, such as ones having different shapes to be mounted on different part of the vehicle, or ones having different numbers of combustion chambers that accommodate gas generating means to control output aspects of the generated gas for inflating the air bag.

Among them, a gas generator provided with a plurality of combustion chambers for accommodating a gas generating agent has been disclosed in JP-A 09-183359, JP-A 11-217055, or the like.

However, in these conventional gas generators, there are rooms for improvement in manufacturing easiness or the like.

SUMMARY OF THE INVENTION

The present invention provides a multistage type gas generator for an air bag which can be easily manufactured. Also, the present invention provides a multistage type gas generator for an air bag in which a plurality of combustion chambers do not influence each other upon combustion of gas generating means contained in the respective combustion chambers, and also, a gas generator which has a simple structure and can be easily assembled.

A multistage type gas generator for an air bag of the present invention comprises, in a cylindrical housing having a gas discharging port, igniting means adapted to be activated by an activating signal, and, in a plurality of combustion chambers defined separately in the cylindrical housing, gas generating means adapted to be ignited and burnt by the ignition means, in which a plurality of the combustion chambers are provided to be aligned with each other in the axial direction of the cylindrical housing Also, a plurality of the combustion chambers are characterized by being provided adjacent to each other in the axial direction of the cylindrical housing.

Particularly, in the present invention, in case of a multistage type gas generator for an air bag in which a plurality of the combustion chambers provided in the housing are arranged to be aligned to each other in series and/or adjacent to each other in the axial direction of the cylindrical housing, and the respective combustion chambers are defined not to be in communication with each other, and further an igniting means is provided in one combustion chambers side is employed, a plurality of the combustion chambers do not influence each other on combustion of the gas generating means included in the combustion chambers, and thereby, for example, it is unnecessary to perform complicated adjustment such as a breaking pressure of a gas discharging port, or a size thereof, and an operation performance can be easily adjusted. Further, assembling or mounting or charging of an inner cylindrical member, an igniting means and a gas generating means can be conducted effectively and easily, and assembling of a gas generator is facilitated. Also, when the igniting means is constituted to include an electric ignition type igniter, a lead wire (or a connector) extending from an actuation signal outputting means or the like can be coupled easily.

Also, in the multistage type gas generator for an air bag of the present invention, it is desirable that a plurality of the combustion chambers provided in the cylindrical housing are separated from each other by a partition wall formed in a plate shape, that the partition wall is arranged on a combustion chamber in which the gas generating means can be ignited the earliest among the adjacent combustion chambers, and that the partition wall abuts against an inner peripheral surface of the cylindrical housing and/or an outer peripheral surface of an inner cylindrical member. With this, the partition wall is pressed onto the inner surface of the housing or the like by combustion pressure of the gas generating means which is first ignited, so that the adjacent combustion chambers can securely be separated, and movement of a fluid such as an operating gas between both the chambers can securely be blocked. Additionally, a seal can securely be achieved between the adjacent combustion chambers with a simple structure. For example, a structure supporting the partition wall which receives a combustion pressure of the gas generating means ignited the earliest can be provided on an inner surface of the housing and at a position of the partition wall. Also, the partition wall is formed by a circular portion and an annular portion formed integrally with a peripheral edge of the circular portion, and the partition wall is designed to be recessed towards the combustion chamber side storing the gas generating means to be ignited the earliest. In this case, the annular portion of the partition wall is pressed onto the inner surface of the housing and/or the outer peripheral surface of the inner cylindrical member by a combustion pressure of the gas generating means.

Furthermore, in the multistage type gas generator for an air bag of the present invention, inner diameters of a plurality of combustion chambers defined separately in the housing can be made different, or inner diameters of a filter means arranged radially outside the respective combustion chambers can be made different. For example, the cylindrical housing is formed by a cylindrical diffuser shell with a top having a plurality of gas discharging ports provided in a peripheral wall and a closure shell closing a lower opening of the diffuser shell. Among a plurality of the combustion chambers defined separately in the housing, the inner diameter of the combustion chamber nearest to the closure shell is formed equal to or larger than those of the other combustion chambers, and/or the inner diameter of the filter means arranged radially outside the combustion chamber nearest to the closure shell can be formed equal to or larger than those of the filter means arranged radially outside the other combustion chambers.

This is because, many gas generators are produced by sequentially assembling constituent members or the like with the diffuser shell turned upside down, and, with above formation, an inlet port at a time of charging the gas generating means can be secured in a broad area, and charging of the gas generating means can be performed easily and securely.

Further, it is desirable that, among the combustion chambers adjacent to each other in the cylindrical housing, an inner diameter of the combustion chamber storing the gas generating means to be ignited later is formed equal to or larger than that of the combustion chamber storing the gas generating means capable of being ignited the earliest, and/or the inner diameter of the filter means arranged radially outside the combustion chamber storing the gas generating means to be ignited later is formed equal to or larger than that of the filter means arranged radially outside the combustion chamber in which the gas generating means is to be ignited the earliest.

The reason of the above is as follows: When the inner diameters of both the filter means are equal to each other, an amount of the gas generating agent in the combustion chamber accommodating the gas generating means which can be ignited at the later timing is generally small, and thereby, the combustion chamber is broadened radially (in a direction of a plan view) (namely, it becomes a thin and broad combustion chamber), and the gas generating means in the combustion chamber has a difficulty in being ignited. However, when formed in the above-described manner, the broadening of the inside of the combustion chamber in the radial direction (in the direction of the plan view) is suppressed, and the gas generating means in the combustion chamber can be ignited easily.

Also, if a heat isolating member and/or a heat isolating space which blocks conduction of a combustion heat of the gas generating means in both the combustion chambers is provided between a plurality of the combustion chambers separated in the cylindrical housing, a flame transfer between the both chambers can further securely be prevented.

Furthermore, a disk-shape retainer provided with an opening hole in which an inner cylindrical member is fitted is arranged in the housing, and the gas generator can easily be assembled by fixing the filter means with the retainer, and a secure fixation can be achieved with a simple structure.

According to the present invention, a multistage type gas generator for an air bag which has a simple structure and can easily be manufactured is realized. Also, according to the present invention, a multistage gas generator for an air bag in which respective combustions of gas generating means respectively included in a plurality of combustion chambers do not influence each other.

BRIEF DESCRIPTION OF THE DRAWINGS

FIGS. 2(a) and 2(b) are horizontal cross sectional schematic views showing one embodiment of flame-direction controlling means.

DETAILED DESCRIPTION OF THE PRESENT INVENTION

Figure 1:
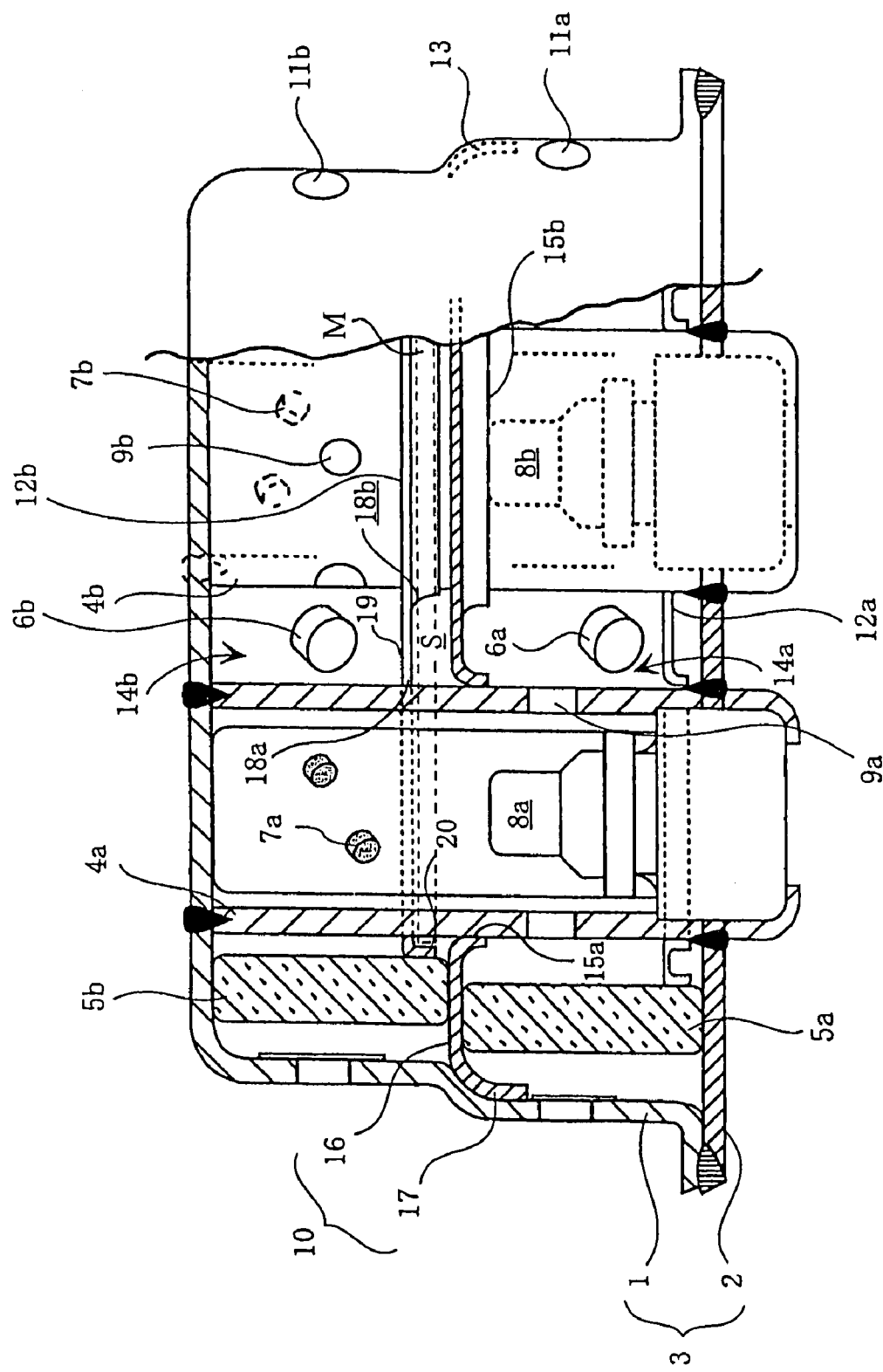
FIG. 1 is a partial cross sectional view showing one embodiment of a gas generator for an air bag of the present invention.

An embodiment of a gas generator for an air bag of the present invention will be explained with reference to the drawings. FIG. 1 is a vertical cross sectional view showing one embodiment of a gas generator for an air bag of the present invention.

The gas generator shown in this drawing has a cylindrical housing 3 having gas discharging ports 11a and 11b. Inside the housing 3, two inner cylindrical members 4a and 4b, which store igniting means (8a and 8b) in an inner space thereof, are disposed in parallel. Two filter means 5a and 5b, formed annularly, are disposed such that they face an inner surface of the housing 3. Combustion chambers 14a and 14b surround the two inner cylindrical members 4a and 4b, and the two filter means 5a and 5b are formed such that they are aligned in an axial direction of the cylindrical housing 3 and adjacent to each other. The combustion chambers 14a and 14b are separated by a partition wall 10. Disk-shaped gas generating agents 6a and 6b are accommodated in the respective combustion chambers 14a and 14b as gas generating means. Incidentally, only one of the inner cylindrical members 4a and 4b may be provided. In such a case, other igniting means (8a or 8b) may be arranged directly in the housing 3.

The cylindrical housing 3 consists of a cylindrical diffuser shell 1, having a top wall, and a disk-shaped closure shell 2 closing a lower end opening of the diffuser shell. In the diffuser shell 1, are two rows of gas discharging ports 11a and 11b. The gas discharging ports 11a and 11b are arranged along imaginary lines extending along a circumferential direction of the housing and are provided spaced apart in an axial direction (namely, a vertical direction) of the housing 3. Also, the diffuser shell 1 has a bent portion 13 formed between the two rows of gas discharging port 11a and 11b, such that an inner diameter of the housing 3 closer to the lower end opening is larger than an inner diameter of the housing 3 closer to the top wall. A flange is formed at the opening end of the diffuser shell 1, and the disk-shaped closure shell 2 is welded to the flange-shaped portion.

In this embodiment, a combustion chamber provided closer to the closure shell 2 (namely, at the lower side in the drawing) is a first combustion chamber 14a, and a combustion chamber provided closer to the top wall (namely, at the upper side in the drawing) is a second combustion chamber 14b. Also, the gas generating agent accommodated in the first combustion chamber 14a is a first gas generating agent 6a, and the gas generating agent accommodated in the second combustion chamber 14b is a second gas generating agent 6b.

The two inner cylindrical members 4a and 4b are arranged inside the housing 3b, such that a center axis of the inner cylindrical member 4a is parallel to a center axis of the inner cylindrical member 4b. Igniting means including electric ignition type igniters 8a and 8b which respectively receive electric actuation signals upon actuation, and transfer charges 7a and 7b which are ignited by actuations of the igniters 8a and 8b are accommodated in inner spaces of the respective inner cylindrical members 4a and 4b. In the inner cylindrical members 4a and 4b, the respective igniting means (8a and 8b) are arranged close to the closure 2, and they are positioned on the same plane.

In a peripheral wall of the inner cylindrical members 4a, a plurality of first flame-transferring holes 9a are aligned along an imaginary line extending in a circumferential direction of the inner cylindrical member 4a. Further, in a peripheral wall of the inner cylindrical member 4b, a plurality of second flame-transferring holes 9b are aligned along an imaginary line extending in a circumferential direction of the inner cylindrical member 4b. The first flame-transferring holes 9a allows the first combustion chamber 14a to communicate with the inner space of the inner cylindrical member 4a, and the second flame-transferring holes 9b allows the second combustion chamber 14b to communicate with the inner space of the inner cylindrical member 4b.

Figure 3:
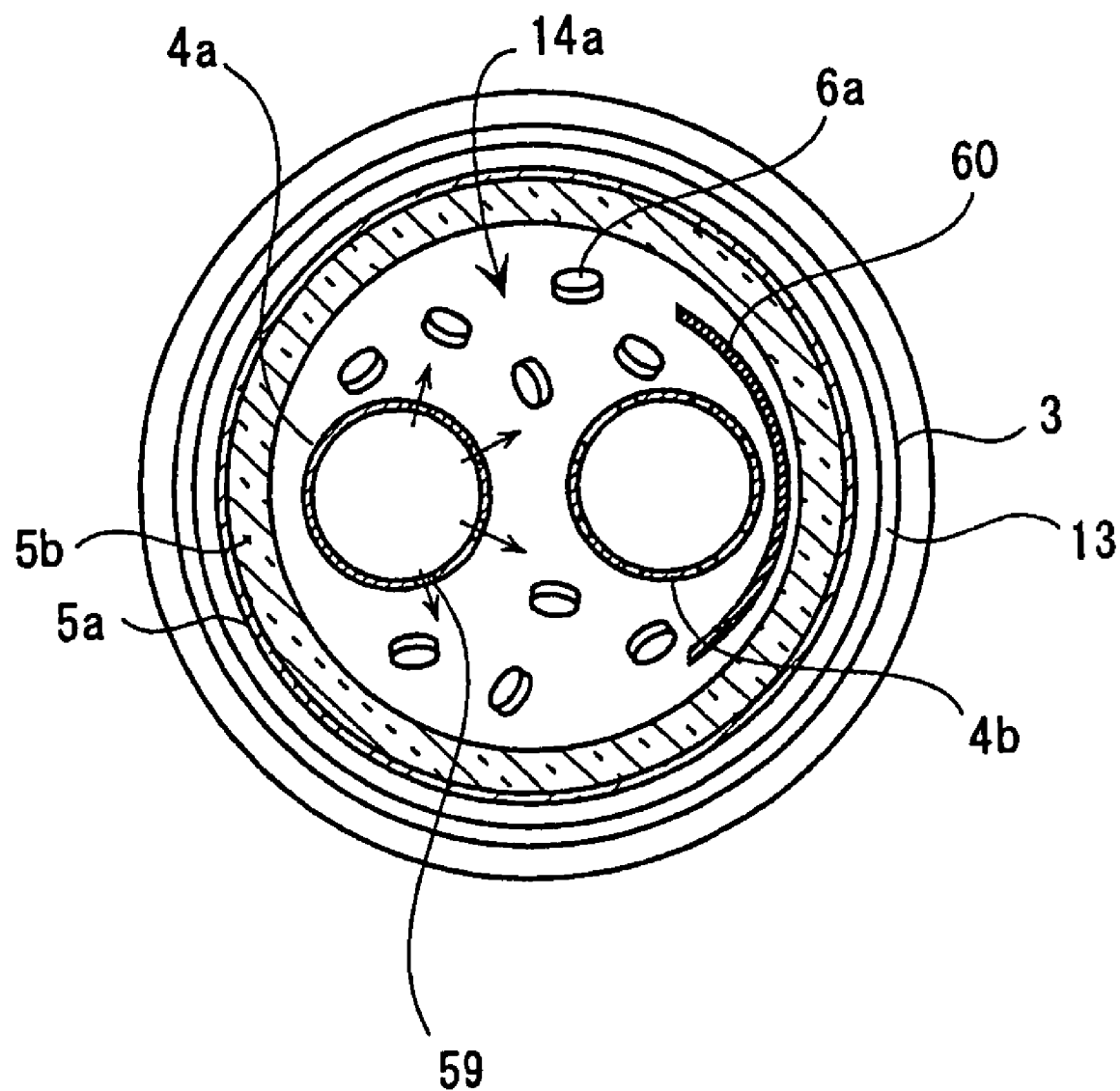
FIG. 3 is a horizontal cross sectional schematic view showing another embodiment of flame-direction controlling means.

The inner cylindrical members 4a and 4b are arranged eccentrically in the cylindrical housing 3. When the inner cylindrical members 4 are arranged eccentrically in this manner, flame-direction controlling means may control ejecting directions of flames ejected from either one of or both of the flame-transferring holes 9a and 9b due to actuation of at least one of the igniting means (8a and 8b). As shown in FIGS. 2(a) and 2(b), for example, the flame-direction controlling means may be the inner cylindrical member 4a and/or 4b that encloses the igniting means and having two or more flame-transferring holes 59 for directing (shown with arrows in the figures) the flame into the central portions of the associated combustion chambers (14a, 14b) and not toward the most closely adjacent and hence, directly opposed chamber walls and inner wall of the housing 3 to the respective inner cylindrical members 4a and 4b. In FIGS. 2(a) and 2(b), the flame-direction controlling means is provided in either one of the inner cylindrical member 4a or 4b. However, the flame-direction controlling means may be provided in both the inner cylindrical members 4a and 4b. Also, as shown in FIG. 3, as the flame-direction controlling means, a bow-shaped wall 60 may be provided, between the aforesaid adjacent walls and a said cylindrical member (4a, 4b) such that the ejecting direction of the flame generated due to actuation of the igniting means can be restricted and directed away from such walls. Further, as shown in FIG. 1, the transfer charge may be accommodated in a container having openings only in a specific direction. By using such a container, the ejecting direction of a flame may be controlled. In FIGS. 2 and 3, the same members as those shown in FIG. 1 are designated with same reference numerals, and explanation thereof has been omitted.

In FIG. 1, a partition wall 10 that separates the first combustion chamber 14a from the second combustion chamber 14b comprises a circular portion 16 having opening holes 15a and 15b into which two inner cylindrical members 4a and 4b are fitted, and an annular portion 17 bent downward from a peripheral edge of the circular portion 16 and formed integrally with the circular portion 16. The annular portion 16 abuts against and supported by the bent portion 13 of the diffuser shell 1. The partition wall 10 may also abut against the inner cylindrical members 4a and 4b. When the first gas generating agent 6a accommodated in the first combustion chamber 14a is ignited and burnt, the partition wall 10 is subjected to a combustion pressure inside the first combustion chamber 14a and is urged against the inner surface of the bent portion 13 of the housing 3 securely. Also, the partition wall 10 may be welded to the cylindrical housing 3 and/or the inner cylindrical members 4a and 4b, or a step can be provided in the inner cylinder such that the partition wall 10 is engages the step and fixed to the inner cylindrical members 4a and 4b, or a strut such as a supporting rod may be arranged in either one of the combustion chambers 14a or 14b. In such cases, even when either one of the gas generating agents 6a or 6b accommodated in the combustion chambers 14a and 14b is burnt first, the partition wall 10 is securely held. As compared with a case where the partition wall 10 just abuts against them, the partition wall can be prevented from deforming or the like when the first gas generating agent 6a is ignited and burnt.

The partition wall 10 not only defines the respective combustion chambers 14a and 14b, but it also defines, in the axial direction of the housing 3, the inner space of the housing formed outside of the two cylindrical members 4a and 4b. The inner cylindrical members 4a and 4b penetrating the partition wall 10 are arranged to penetrate the combustion chambers 14a and 14b. Incidentally, the inner cylindrical members 4a and 4b may be arranged not to penetrate any combustion chamber.

The annular filter means 5a and 5b are disposed in the respective combustion chambers 14a and 14, which are defined by the partition wall 10, inside the inner space of the housing 3, such that the filter means 5a and 5b oppose the inner surface of the housing 3. The filter means 5a and 5b may be formed by winding a metal wire mesh such that the mesh is layered, or alternatively, it may be formed by winding an expanded metal such that the expanded metal is multi-layered. Besides, any member that can cool and/or purify an operating gas generated by combustion of the gas generating agents 6a and 6b can be used as the filter means 5a and 5b.

In the present embodiment, the filter means 5a provided inside the combustion chamber 14a is different from the filter means 5b provided inside the combustion chamber 14b. Particularly, the filter means 5a and 5b are different in their inner diameters. In other words, the filter means 5a, which surrounds the combustion chamber 14a has an inner diameter larger than that of the filter means 5b, which surrounds the combustion chamber 14b. Thereby, charging of the gas generating agents 6a and 6b into the combustion chambers 14a and 14b surrounded by the filter means 5a and 5b can easily be performed. This is to obtain a wide opening when assembling the gas generator with the diffuser shell 1 turned upside-down. Also, since the second filter means 5b has a smaller inner diameter than that of the first filter means 5a, with respect to the combustion chambers 14a and 14b surrounded by the respective filter means 5a and 5b, the second combustion chamber 14b is formed radially smaller than the first combustion chamber 14a. By this design, the second gas generating agent 6b can be burnt more easily.

The respective filter means 5a and 5b are supported by retainers 12a and 12b arranged in the respective combustion chambers 14a and 14b. The retainers 12a and 12b comprise circular portions 19 having opening holes 18a and 18b, respectively, in which two inner cylindrical members 4a and 4b are fitted, and the annular portion 20 formed integrally with the circular portions at the peripheral edges thereof. Outer peripheral surfaces of the annular portions 20 of the respective retainers 12a and 12b abut against inner peripheral surfaces of the respective filter means 5a and 5b to support them.

In particular, in the gas generator shown in the present embodiment, the second retainer 12b provided inside the second combustion chamber 14b secures a space S between the second retainer and the partition wall 10 that define two combustion chambers 14a and 14b. The space S functions as a heat-insulating space, which blocks conduction of a combustion heat of the gas generating agent in either combustion chamber to the other combustion chamber. Also, instead of the heat insulating space or together with the heat insulating space, a heat-insulating member M formed with a member having at least heat insulating performance can be arranged between the combustion chambers 14a and 14b.

Incidentally, when the partition wall 10 separates the combustion chambers 14a and 14b, but does not define a housing inner space formed outside of the two inner cylindrical members 4a and 4b, a single cylindrical filter means can be arranged opposing the inner surface of the housing 3.

Next, an operation of the gas generator shown in the figures will be explained. By an actuation of the first igniter 8a included in the first igniting means, the first transfer charge 7a provided just above the first igniter 8a is ignited and burnt, and a flame from the first transfer charge 7a ruptures a seal tape (not shown) that closes the flame-transferring holes 9a formed in the first inner cylindrical member 4a to eject the flame into the first combustion chamber 14a, thereby igniting and burning the first gas generating agent 6a. The first gas generating agent 6a burns such that an operating gas for inflating an air bag is generated and the gas passes through the first filter means 5a and is discharged from the first row of gas discharging ports 11a.

Meanwhile, when the second igniter 8b included in the second igniting means is actuated, the second transfer charge 7b is ignited and burnt, and a flame from the second transfer charge 7b is ejected from the flame-transferring holes 9b, formed in the second inner cylindrical member 4b, into the second combustion chamber 14b to ignite and burn the second gas generating agent 6b. An operating gas generated by the second gas generating agent 6b passes through the second filter means 5b and is discharged from the second row of gas discharging ports 11b.

Actuation timings of the first igniter 8a and the second igniter 8b are adjusted in order to obtain an optimal output pattern of an operating gas required at the time of actuation of the gas generator. For example, the actuation timing is adjusted such that the first igniter 8a and the second igniter 8b are actuated simultaneously, thereby burning the gas generating agents 6a and 6b accommodated in the combustion chambers 14a and 14b simultaneously, or such that, the second igniter 8b is actuated, slightly after actuation of the first igniter 8a, thereby differentiating combustion start timings of the gas generating agents 6a and 6b accommodated in the respective combustion chambers 14a and 14b.

In particular, when the first igniter 8a is actuated slightly earlier than the second igniter 8b, the second gas generating agent 6b is left unignited while the first gas generating agent 6a is burnt to generate the operating gas. Even in such a case, it is desirable that the ignition start timing of the second gas generating agent 6b is adjusted exclusively by the second igniting means.

In the gas generator shown in the present embodiment, the first combustion chamber 14a and the second combustion chamber 14b are separated by the partition wall 10, the first filter means 5a is not the same as the second filter means 5b, and the first filter means 5a is arranged in a space defined separately from the second filter means 5b. Therefore, the operating gas generated by combustion of the first gas generating agent 6a is prevented from flowing into the second combustion chamber 14b. Also, the heat-insulating space is secured between the first combustion chamber 14a and the second combustion chamber 14b, so that the combustion heat of the first gas generating agent 6a is prevented from conducting to the second combustion chamber 14b via the partition wall 10 or the like. Accordingly, in the gas generator shown in the present embodiment, even when the gas generating agents 6a and 6b in the respective combustion chambers are ignited at different timings, ignition timings of the respective gas generating agents can be adjusted exclusively by actuation timings of the respective igniting means.

By adjusting the activation timings of the respective igniting means (or the respective igniters 8a and 8b), the output aspect (operation performance) of the gas generator can arbitrarily be adjusted. In various situations such as a speed of a vehicle at the time of a collision, an environmental temperature, or the like, a deployment of an air bag can be set most properly when the gas generator of the present invention is utilized in an air bag apparatus described later. Incidentally, gas generating agents having different shapes (for example, a single-perforated gas generating agent and a porous gas generating agent) can be used for the respective first and second combustion chambers 14a and 14b. Also, the amount of the gas generating agents 6a and 6b accommodated in the first and second combustion chambers 14a and 14b can be adjusted properly. The shape, size, composition, composition ratio, amount, and the like of the gas generating agents can, of course, be modified properly in order to obtain a desired output aspect.

The invention claimed is:

1. A multistage gas generator for an air bag, comprising:
a cylindrical housing having at least one first gas discharging port and at least one second gas discharging port;
a first inner cylindrical member disposed inside the cylindrical housing and provided, in a peripheral wall thereof, with first flame-transferring holes, both end portions of the first inner cylindrical member being in contact with the cylindrical housing;
a second inner cylindrical member disposed inside the cylindrical housing and provided, in a peripheral wall thereof, with second flame transferring holes, both end portions of the second inner cylindrical member being in contact with the cylindrical housing;
a first combustion chamber provided inside the cylindrical housing and accommodating a first gas generating agent therein;
a second combustion chamber provided inside the cylindrical housing and on top of the first combustion chamber with respect to an axial direction of the cylindrical housing and accommodating a second gas generating agent therein, the second combustion chamber being defined separately and without communication with the first combustion chamber, such that a first gas generated in the first combustion chamber is discharged only through the at least one first gas discharging port and a second gas generated inside the second combustion chamber is discharged only through the at least one second gas discharging port;
first igniting means adapted to ignite the first gas generating agent accommodated inside the first combustion chamber; and
second igniting means adapted to ignite the second gas generating agent accommodated inside the second combustion chamber.

2. A multistage gas generator for an air bag, comprising:
a cylindrical housing having a plurality of first gas discharging ports provided in an upper half of the cylindrical housing, and a plurality of second gas discharging ports provided in a lower half of the cylindrical housing;
a first inner cylindrical member disposed inside the cylindrical housing and provided, in a peripheral wall thereof, with first flame-transferring holes, both end portions of the first inner cylindrical member being in contact with the cylindrical housing;
a second inner cylindrical member disposed inside the cylindrical housing and provided, in a peripheral wall thereof, with second flame transferring holes, both end portions of the second inner cylindrical member being in contact with the cylindrical housing;
a first combustion chamber provided inside the cylindrical housing and accommodating a first gas generating agent therein;
a second combustion chamber provided inside the cylindrical housing and on top of the first combustion chamber with respect to an axial direction of the cylindrical housing and accommodating a second gas generating agent therein, the second combustion chamber being defined separately and without communication with the first combustion chamber, such that a first gas generated in the first combustion chamber is discharged only through the first gas discharging ports and a second gas generated inside the second combustion chamber is discharged only through the second gas discharging ports;
first igniting means adapted to ignite the first gas generating agent accommodated inside the first combustion chamber; and
second igniting means adapted to ignite the second gas generating agent accommodated inside the second combustion chamber.

3. A multistage gas generator for an air bag according to claim 1 or 2,
wherein the first igniting means is accommodated in an inner space of the first inner cylindrical member and the second igniting means is accommodated in an inner space of the second inner cylindrical member.

4. A multistage gas generator for an air bag according to claim 3, wherein the second inner cylindrical member penetrates the first combustion chamber and the second combustion chamber in the axial direction of the cylindrical housing.

5. A multistage gas generator for an air bag according to claim 3, wherein the inner space of the first inner cylindrical member is in communication with the first combustion chamber, and the inner space of the second inner cylindrical member is in communication with the second combustion chamber.

6. A multistage gas generator for an air bag according to claim 3, wherein at least one of the first inner cylindrical member and the second inner cylindrical member is arranged eccentrically in the housing, and an ejecting direction of a flame ejected from the flame-transferring holes of the at least one of the first inner cylindrical member and the second inner cylindrical member is controlled by flame-direction controlling means.

7. A multistage gas generator for an air bag according to claim 1, further comprising:
first cylindrical filter means for one of purifying and cooling the first gas generated by combustion of the first gas generating agent, the first cylindrical filter means surrounding the first combustion chamber; and
second cylindrical filter means for one of purifying and cooling the second gas generated by combustion of the second gas generating agent, the second cylindrical filter means surrounding the second combustion chamber.

8. A multistage gas generator for an air bag according to claim 7, wherein the cylindrical housing includes a cylindrical diffuser shell, having a top wall and a peripheral wall provided with the first gas discharging port and the second gas discharging port, and a closure shell which closes an open end of the diffuser shell, and
an inner diameter of the first cylindrical filter means disposed adjacent to the closure shell is equal to or larger than an inner diameter of the second cylindrical filter means provided further apart from the closure shell.

9. A multistage gas generator for an air bag according to claim 1, wherein the cylindrical housing includes a cylindrical diffuser shell, having a top wall and a peripheral wall provided with the first gas discharging port and the second gas discharging port, and a closure shell which closes an open end of the diffuser shell, and
an outer diameter of the first combustion chamber provided adjacent to the closure shell is equal to or larger than an outer diameter of the second combustion chamber.

10. A multistage gas generator for an air bag according to claim 1, further comprising:
at least one of a heat insulating member and a heat insulating space which blocks conduction of a combustion heat from one of the first combustion chamber and the second combustion chamber to the other of the first combustion chamber and the second combustion chamber.

11. A multistage gas generator for an air bag according to claim 1, wherein the first igniting means and the second igniting means are provided at a predetermined side of the cylindrical housing.

12. A multistage gas generator for an air bag according to claim 1, wherein the first igniting means and the second igniting means are arranged on a common plane of the cylindrical housing.

13. A multistage gas generator for an air bag according to claim 1, wherein the cylindrical housing includes a cylindrical diffuser shell, having a top wall and a peripheral wall provided with the first gas discharging port and the second gas discharging port, and a closure shell which closes an open end of the diffuser shell, and the first igniting means and the second igniting means are arranged on a side closer to the closure shell than the top wall.

14. A multistage gas generator for an air bag according to claim 1, wherein the first combustion chamber and the second combustion chamber are separated from each other by a partition wall made of a plate member.

15. A multistage gas generator for an air bag according to claim 14,
wherein the partition wall abuts against at least one of an inner peripheral surface of the cylindrical housing, an outer peripheral surface of the first inner cylindrical member, and an outer peripheral surface of the second inner cylindrical member.

16. A multistage gas generator for an air bag according to claim 14,
wherein the partition wall is welded to at least one of the cylindrical housing, the first inner cylindrical member, and the second inner cylindrical member.

17. A multistage gas generator for an air bag, comprising:
a cylindrical housing having at least one first gas discharging port and at least one second gas discharging port;
a first combustion chamber provided inside the cylindrical housing;
a second combustion chamber provided inside the cylindrical housing and on top of the first combustion chamber with respect to an axial direction of the cylindrical housing, the second combustion chamber being defined separately and without communication with the first combustion chamber, such that a first gas generated in the first combustion chamber is discharged only through the at least one first gas discharging port and a second gas generated inside the second combustion chamber is discharged only through the at least one second gas discharging port;
a first inner cylindrical member disposed inside the cylindrical housing and provided, in a peripheral wall thereof, with first flame-transferring holes, both end portions of the first inner cylindrical member being in contact with the cylindrical housing;
a second inner cylindrical member disposed inside the cylindrical housing and provided, in a peripheral wall thereof, with second flame transferring holes, both end portions of the second inner cylindrical member being in contact with the cylindrical housing;
first igniting means accommodated in an inner space of the first inner cylindrical member;
second igniting means accommodated in an inner space of the second inner cylindrical member;
first gas generating means accommodated inside the first combustion chamber and adapted to be ignited and burnt by the first igniting means; and
second gas generating means accommodated inside the second combustion chamber and adapted to be ignited and burnt by the second igniting means.

18. A multistage gas generator for an air bag according to claim 17, wherein the second inner cylindrical member is provided along the axial direction of the cylindrical housing, and penetrates the first combustion chamber and the second combustion chamber in the axial direction of the cylindrical housing.

19. A multistage gas generator for an air bag according to claim 17 or 18, wherein the inner space of the first inner cylindrical member is in communication with the first combustion chamber, and the inner space of the second inner cylindrical member is in communication with the second combustion chamber.

20. A multistage gas generator for an air bag according to claim 17, wherein at least one of the first inner cylindrical member and the second inner cylindrical member is arranged eccentrically in the housing, and an ejecting direction of a flame ejected from the flame-transferring holes of at least one of the first inner cylindrical member and the second inner cylindrical member is controlled by a flame-direction controlling means.

21. A multistage gas generator for an air bag according to claim 17, further comprising:
first cylindrical filter means for one of purifying and cooling a first gas generated by combustion of the first gas generating means, the first filter means surrounding the first combustion chamber; and
second cylindrical filter means for one of purifying and cooling the second gas generated by combustion of the second gas generating means, the second cylindrical filter means surrounding the second combustion chamber.

22. A multistage gas generator for an air bag according to claim 21, wherein the cylindrical housing includes a cylindrical diffuser shell, having a top wall and a peripheral wall provided with the first gas discharging port and the second gas discharging port, and a closure shell which closes an open end of the diffuser shell, and
an inner diameter of the first cylindrical filter means disposed adjacent to the closure shell is equal to or larger than an inner diameter of the second cylindrical filter means provided further apart from the closure shell.

23. A multistage gas generator for an air bag according to claim 17, wherein the cylindrical housing includes a cylindrical diffuser shell, having a top wall and a peripheral wall provided with the first gas discharging hole and the second gas discharging hole, and a closure shell which closes an open end of the diffuser shell, and
an outer diameter of the first combustion chamber provided adjacent to the closure shell is equal to or larger than an outer diameter of the second combustion chamber.

24. A multistage gas generator for an air bag according to claim 17, further comprising:
at least one of a heat insulating member and a heat insulating space which blocks conduction of a combustion heat from one of the first combustion chamber and the second combustion chamber to the other of the first combustion chamber and the second combustion chamber.

25. A multistage gas generator for an air bag according to claim 17, wherein the first igniting means and the second igniting means are provided at a predetermined side of the cylindrical housing.

26. A multistage gas generator for an air bag according to claim 17, wherein the first igniting means and the second igniting means are arranged on a common plane of the cylindrical housing.

27. A multistage gas generator for an air bag according to claim 17, wherein the cylindrical housing includes a cylindrical diffuser shell, having a top wall and a peripheral wall provided with the first gas discharging port and the second gas discharging port, and a closure shell which closes an open end of the diffuser shell, and the first igniting means and the second igniting means are arranged on a side closer to the closure shell than the top wall.

28. A multistage gas generator for an air bag according to claim 17, wherein the first combustion chamber and the second combustion chamber are separated from each other by a partition wall made of a plate member.

29. A multistage gas generator for an air bag according to claim 28, wherein the partition wall abuts against at least one of an inner peripheral surface of the cylindrical housing, an outer peripheral surface of the first inner cylindrical member, and an outer peripheral surface of the second inner cylindrical member.

30. A multistage gas generator for an air bag according to claim 28 or 29, wherein the partition wall is welded to at least one of the cylindrical housing, the first inner cylindrical member, and the second inner cylindrical member.

31. A multistage gas generator for an air bag, comprising:
a cylindrical housing having a at least one first gas discharging port and at least one second gas discharging port;
a first inner cylindrical member disposed inside the cylindrical housing and provided, in a peripheral wall thereof, with first flame-transferring holes, both end portions of the first inner cylindrical member being in contact with the cylindrical housing;
a second inner cylindrical member disposed inside the cylindrical housing and provided, in a peripheral wall thereof, with second flame transferring holes, both end portions of the second inner cylindrical member being in contact with the cylindrical housing;
a first combustion chamber provided inside the cylindrical housing;
a second combustion chamber provided inside the cylindrical housing and on top of the first combustion chamber with respect to an axial direction of the cylindrical housing, the second combustion chamber being defined separately and without communication with the first combustion chamber, such that a first gas generated in the first combustion chamber is discharged only through the at least one first gas discharging port and a second gas generated inside the second combustion chamber is discharged only through the at least one second gas discharging port;
first igniting means accommodated inside the first combustion chamber;
second igniting means accommodated inside the second combustion chamber;
a first gas generating means accommodated inside the first combustion chamber and adapted to be ignited and burnt by the first igniting means;
second gas generating means accommodated inside the second combustion chamber and adapted to be ignited and burnt by the second igniting means;
first cylindrical filter means for one of purifying and cooling a first gas generated by combustion of the first gas generating means, the first cylindrical filter means surrounding the first combustion chamber; and
second cylindrical filter means for one of purifying and cooling the second gas generated by combustion of the second gas generating means, the second cylindrical filter means surrounding the second combustion chamber.

32. A multistage gas generator for an air bag according to claim 31, wherein the cylindrical housing includes a cylindrical diffuser shell, having a top wall and a peripheral wall provided with the first gas discharging port and the second gas discharging port, and a closure shell which closes an open end of the diffuser shell, and
an inner diameter of the first cylindrical filter means disposed adjacent to the closure shell is equal to or larger than an inner diameter of the second cylindrical filter means provided further apart from the closure shell.

33. A multistage gas generator for an air bag according to claim 31, wherein the cylindrical housing includes a cylindrical diffuser shell, having a top wall and a peripheral wall provided with the first gas discharging hole and the second gas discharging hole, and a closure shell which closes an open end of the diffuser shell, and
an outer diameter of the first combustion chamber provided adjacent to the closure shell is equal to or larger than an outer diameter of the second combustion chamber.

34. A multistage gas generator for an air bag according to claim 31, further comprising:
at least one of a heat insulating member and a heat insulating space which blocks conduction of a combustion heat from one of the first combustion chamber and the second combustion chamber to the other of the first combustion chamber and the second combustion chamber.

35. A multistage gas generator for an air bag according to claim 31, wherein the first igniting means and the second igniting means are provided at a predetermined side of the cylindrical housing.

36. A multistage gas generator for an air bag according to claim 31, wherein the first igniting means and the second igniting means are arranged on a common plane of the cylindrical housing.

37. A multistage gas generator for an air bag according to claim 31, wherein the cylindrical housing includes a cylindrical diffuser shell, having a top wall and a peripheral wall provided with the first gas discharging port and the second gas discharging port, and a closure shell which closes an open end of the diffuser shell, and the first igniting means and the second igniting means are arranged on a side closer to the closure shell than the top wall.

38. A multistage gas generator for an air bag according to claim 31, wherein the first combustion chamber and the second combustion chamber are separated from each other by a partition wall made of a plate member.

39. A multistage gas generator for an air bag according to claim 38,
wherein the partition wall abuts against at least one of an inner peripheral surface of the cylindrical housing, an outer peripheral surface of the first inner cylindrical member, and an outer peripheral surface of the second inner cylindrical member.

40. A multistage gas generator for an air bag according to claim 38,
wherein the partition wall is welded to at least one of the cylindrical housing, the first inner cylindrical member, and the second inner cylindrical member.

41. A multistage gas generator for an air bag, comprising:
a cylindrical housing including a cylindrical diffuser shell having a top wall, and a peripheral wall provided with at least one first gas discharging port and at least one second gas discharging port, and a closure shell which closes an open end of the diffuser shell;
a first inner cylindrical member disposed inside the cylindrical housing and provided, in a peripheral wall thereof, with first flame-transferring holes, a first end portion of the first inner cylindrical member being in contact with the diffuser shell and a second end portion being in contact with the closure shell;
a second inner cylindrical member disposed inside the cylindrical housing and provided, in a peripheral wall thereof, with second flame transferring holes, a first end portion of the second inner cylindrical member being in contact with the diffuser shell and a second end portion being in contact with the closure shell;
a first combustion chamber provided inside the cylindrical housing;
a second combustion chamber provided inside the cylindrical housing and on top of the first combustion chamber with respect to an axial direction of the cylindrical housing, the second combustion chamber being defined separately and without communication with the first combustion chamber, such that a first gas generated in the first combustion chamber is discharged only through the at least one first gas discharging port and a second gas generated inside the second combustion chamber is discharged only through the at least one second gas discharging port, an inner diameter of the first combustion chamber provided nearest to the closure shell in the cylindrical housing being equal to or larger than a diameter of the second combustion chamber;

first igniting means actuated by a first actuation signal;

a second igniting means actuated by a second actuation signal;

first gas generating means accommodated inside the first combustion chamber and adapted to be ignited and burnt by the first igniting means; and second gas generating means accommodated inside the second combustion chamber and adapted to be ignited and burnt by the second igniting means.

42. A multistage gas generator for an air bag according to claim 41, further comprising:

at least one of a heat insulating member and a heat insulating space which blocks conduction of a combustion heat from one of the first combustion chamber and the second combustion chamber to the other of the first combustion chamber and the second combustion chamber.

43. A multistage gas generator for an air bag according to any one of claims 41 or 42, wherein the first igniting means and the second igniting means are provided at a predetermined side of the cylindrical housing.

44. A multistage gas generator for an air bag according to claim 41, wherein the first igniting means and the second igniting means are arranged on a common plane of the cylindrical housing.

45. A multistage gas generator for an air bag according to claim 41, wherein the first igniting means and the second igniting means are arranged on a side closer to the closure shell than the top wall.

46. A multistage gas generator for an air bag according to claim 41, wherein the first combustion chamber and the second combustion chamber are separated from each other by a partition wall made of a plate member.

47. A multistage gas generator for an air bag according to claim 46,
wherein the partition wall abuts against at least one of an inner peripheral surface of the cylindrical housing, an outer peripheral surface of the first inner cylindrical member, and an outer peripheral surface of the second inner cylindrical member.

48. A multistage gas generator for an air bag according to claim 46,
wherein the partition wall is welded to at least one of the cylindrical housing, the first inner cylindrical member, and the second inner cylindrical member.

49. A multistage gas generator for an air bag, comprising:
a cylindrical housing having at least one first gas discharging port and at least one second gas discharging port;

a first inner cylindrical member disposed inside the cylindrical housing and provided, in a peripheral wall thereof, with first flame-transferring holes, both end portions of the first inner cylindrical member being in contact with the cylindrical housing;

a second inner cylindrical member disposed inside the cylindrical housing and provided, in a peripheral wall thereof, with second flame transferring holes, both end portions of the second inner cylindrical member being in contact with the cylindrical housing;

a first combustion chamber provided inside the cylindrical housing;

a second combustion chamber provided inside the cylindrical housing and on top of the first combustion chamber with respect to an axial direction of the cylindrical housing, the second combustion chamber being defined separately and without communication with the first combustion chamber, such that a first gas generated in the first combustion chamber is discharged only through the at least one first gas discharging port and a second gas generated inside the second combustion chamber is discharged only through the at least one second gas discharging port;

first igniting means adapted to be actuated by a first actuation signal;

second igniting means adapted to be actuated by a second actuation signal;

first gas generating means accommodated inside the first combustion chamber and adapted to be ignited and burnt by the first igniting means;

second gas generating means accommodated inside the second combustion chamber and adapted to be ignited and burnt by the second igniting means; and at least one of a heat insulating member and a heat insulating space which blocks conduction of a combustion heat from one of the first combustion chamber and the second combustion chamber to the other of the first combustion chamber and the second combustion chamber.

50. A multistage gas generator for an air bag according to claim 49, wherein the first igniting means and the second igniting means are provided at a predetermined side of the cylindrical housing.

51. A multistage gas generator for an air bag according to claim 49 or 50, wherein the first igniting means and the second igniting means are arranged on a common plane of the cylindrical housing.

52. A multistage gas generator for an air bag according to claim 49, wherein the cylindrical housing includes a cylindrical diffuser shell, having a top wall and a peripheral wall provided with the first gas discharging port and the second gas discharging port, and a closure shell which closes an open end of the diffuser shell, and the first igniting means and the second igniting means are arranged on a side closer to the closure shell than the top, wall.

53. A multistage gas generator for an air bag according to claim 49, wherein the first combustion chamber and the second combustion chamber are separated from each other by a partition wall made of a plate member.

54. A multistage gas generator for an air bag according to claim 53,
wherein the partition wall abuts against at least one of an inner peripheral surface of the cylindrical housing, an outer peripheral surface of the first inner cylindrical member, and an outer peripheral surface of the second inner cylindrical member.

55. A multistage gas generator for an air bag according to claim 53,
wherein the partition wall is welded to at least one of the cylindrical housing, the first inner cylindrical member, and the second inner cylindrical member.

56. A multistage gas generator for an air bag, comprising:
a cylindrical housing having at least one first gas discharging port and at least one second gas discharging port;

a first inner cylindrical member disposed inside the cylindrical housing and provided, in a peripheral wall thereof, with first flame-transferring holes, both end portions of the first inner cylindrical member being in contact with the cylindrical housing;

a second inner cylindrical member disposed inside the cylindrical housing and provided, in a peripheral wall thereof, with second flame transferring holes, both end portions of the second inner cylindrical member being in contact with the cylindrical housing;

a first combustion chamber provided inside the cylindrical housing;

a second combustion chamber provided inside the cylindrical housing and on top of the first combustion chamber with respect to an axial direction of the cylindrical housing, the second combustion chamber being defined separately and without communication with the first combustion chamber, such that a first gas generated in the first combustion chamber is discharged only through the at least one first gas discharging port and a second gas generated inside the second combustion chamber is discharged only through the at least one second gas discharging port;

first igniting means actuated by a first actuation signal and disposed on a first side of the cylindrical housing;

second igniting means actuated by a second actuation signal and disposed on the first side of the cylindrical housing;

first gas generating means accommodated inside the first combustion chamber and adapted to be ignited and burnt by the first igniting means; and second gas generating means accommodated inside the second combustion chamber and adapted to be ignited and burnt by the second igniting means.

57. A multistage gas generator for an air bag, comprising:

a cylindrical housing having at least one first gas discharging port and at least one second gas discharging port;

a first inner cylindrical member disposed inside the cylindrical housing and provided, in a peripheral wall thereof, with first flame-transferring holes, both end portions of the first inner cylindrical member being in contact with the cylindrical housing;

a second inner cylindrical member disposed inside the cylindrical housing and provided, in a peripheral wall thereof, with second flame transferring holes, both end portions of the second inner cylindrical member being in contact with the cylindrical housing;

a first combustion chamber provided inside the cylindrical housing;

a second combustion chamber provided inside the cylindrical housing and on top of the first combustion chamber with respect to an axial direction of the cylindrical housing, the second combustion chamber being defined separately and without communication with the first combustion chamber, such that a first gas generated in the first combustion chamber is discharged only through the at least one first gas discharging port and a second gas generated inside the second combustion chamber is discharged only through the at least one second gas discharging port;

first igniting means actuated by a first actuation signal and disposed on a first plane of the cylindrical housing;

second igniting means actuated by a second actuation signal and disposed on the first plane of the cylindrical housing;

first gas generating means accommodated inside the first combustion chamber and adapted to be ignited and burnt by the first igniting means; and second gas generating means accommodated inside the second combustion chamber and adapted to be ignited and burnt by the second igniting means.

58. A multistage gas generator for an air bag, comprising:

a cylindrical housing including a cylindrical diffuser shell having a top wall, and a peripheral wall provided with at least one first gas discharging port and at least one second gas discharging port, and a closure shell which closes a lower opening of the diffuser shell;

a first inner cylindrical member disposed inside the cylindrical housing and provided, in a peripheral wall thereof, with first flame-transferring holes, a first end portion of the first inner cylindrical member being in contact with the diffuser shell and a second end portion being in contact with the closure shell;

a second inner cylindrical member disposed inside the cylindrical housing and provided, in a peripheral wall thereof, with second flame transferring holes, a first end portion of the second inner cylindrical member being in contact with the diffuser shell and a second end portion being in contact with the closure shell;

a first combustion chamber provided inside the cylindrical housing;

a second combustion chamber provided inside the cylindrical housing and on top of the first combustion chamber with respect to an axial direction of the cylindrical housing, the second combustion chamber being defined separately and without communication with the first combustion chamber, such that a first gas generated in the first combustion chamber is discharged only through the at least one first gas discharging port and a second gas generated inside the second combustion chamber is discharged only through the at least one second gas discharging port, an inner diameter of the first combustion chamber provided nearest to the closure shell in the cylindrical housing being equal to or larger than a diameter of the second combustion chamber;

first igniting means adapted to be actuated by a first actuation signal;

second igniting means adapted to be actuated by a second actuation signal;

first gas generating means accommodated inside the first combustion chamber and adapted to be ignited and burnt by the first igniting means, the first gas generating means being arranged on a side closer to the top wall than the closure shell;

second gas generating means accommodated inside the second combustion chamber and adapted to be ignited and burnt by the second igniting means, the second gas generating means being arranged on a side closer to the closure shell than the top wall.

59. A multistage gas generator for an air bag according to any one of claims 56 to 58, wherein the first combustion chamber and the second combustion chamber are separated from each other by a partition wall made of a plate member.

60. A multistage gas generator for an air bag according to claim 59, wherein the partition wall abuts against at least one of an inner peripheral surface of the cylindrical housing, an outer peripheral surface of the first inner cylindrical member, and an outer peripheral surface of the second inner cylindrical member.

61. A multistage gas generator for an air bag according to claim 59,
wherein the partition wall is welded to at least one of the cylindrical housing, the first inner cylindrical member, and the second inner cylindrical member.

62. A multistage gas generator for an air bag, comprising:
a cylindrical housing having at least one first gas discharging port and at least one second gas discharging port;
a first inner cylindrical member disposed inside the cylindrical housing and provided, in a peripheral wall thereof, with first flame-transferring holes, both end portions of the first inner cylindrical member being in contact with the cylindrical housing;
a second inner cylindrical member disposed inside the cylindrical housing and provided, in a peripheral wall thereof, with second flame transferring holes, both end portions of the second inner cylindrical member being in contact with the cylindrical housing;
a first combustion chamber provided inside the cylindrical housing;
a second combustion chamber provided inside the cylindrical housing and on top of the first combustion chamber with respect to an axial direction of the cylindrical housing, the second combustion chamber being defined separately and without communication with the first combustion chamber, such that a first gas generated in the first combustion chamber is discharged only through the at least one first gas discharging port and a second gas generated inside the second combustion chamber is discharged only through the at least one second gas discharging port;
a partition wall made of a plate member that separates the first combustion chamber and the second combustion chamber;
first igniting means actuated by a first actuation signal;
second igniting means actuated by a second actuation signal;
first gas generating means accommodated inside the first combustion chamber and adapted to be ignited and burnt by the first igniting means; and
second gas generating means accommodated inside the second combustion chamber and adapted to be ignited and burnt by the second igniting means.

63. A multistage gas generator for an air bag according to claim 62,
wherein the partition wall abuts against at least one of an inner peripheral surface of the cylindrical housing, an outer peripheral surface of the first inner cylindrical member, and an outer peripheral surface of the second inner cylindrical member.

64. A multistage gas generator for an air bag according to claim 62,
wherein the partition wall is welded to at least one of the cylindrical housing, the first inner cylindrical member, and the second inner cylindrical member.

65. A multistage gas generator for an air bag, comprising:
a cylindrical housing having at least one first gas discharging port and at least one second gas discharging port;
a first combustion chamber provided inside the cylindrical housing and accommodating a first gas generating agent therein;
a second combustion chamber provided inside the cylindrical housing and on top of the first combustion chamber with respect to an axial direction of the cylindrical housing and accommodating a second gas generating agent therein, the second combustion chamber being defined separately and without communication with the first combustion chamber, such that a first gas generated in the first combustion chamber is discharged only through the at least one first gas discharging port and a second gas generated inside the second combustion chamber is discharged only through the at least one second gas discharging port;
a first inner cylindrical member disposed inside the cylindrical housing and provided, in a peripheral wall thereof, with first flame-transferring holes that allow communication between an interior of the first cylindrical member and the first combustion chamber; and
a second inner cylindrical member disposed inside the cylindrical housing and provided, in a peripheral wall thereof, with second flame-transferring holes that allow communication between an interior of the second cylindrical member and the second combustion chamber,
wherein flames are discharged through at least one of the first flame-transferring holes,
wherein the directions of the flames are controlled by not providing said at least one of the first flame-transferring holes and the second flame-transferring holes at a position directly opposing a portion of an inner surface of the cylindrical housing, and
wherein the directions of the flames are controlled by providing a wall between at least one of the first inner cylindrical member and the second inner cylindrical member and a portion of an inner surface of the cylindrical housing.

66. The multistage gas generator for an air bag according to claim 65,
wherein both end portions of the first inner cylindrical member and the second inner cylindrical member are in contact with the cylindrical housing.

67. The multistage gas generator for an air bag according to claim 65,
wherein the wall is provided at a position where said at least one of the first inner cylindrical member and the second inner cylindrical member becomes closest to the inner surface of the cylindrical housing.

* * * * *